Oct. 8, 1929.  F. S. FROST  1,731,045
MILKING APPARATUS
Filed Sept. 18, 1924
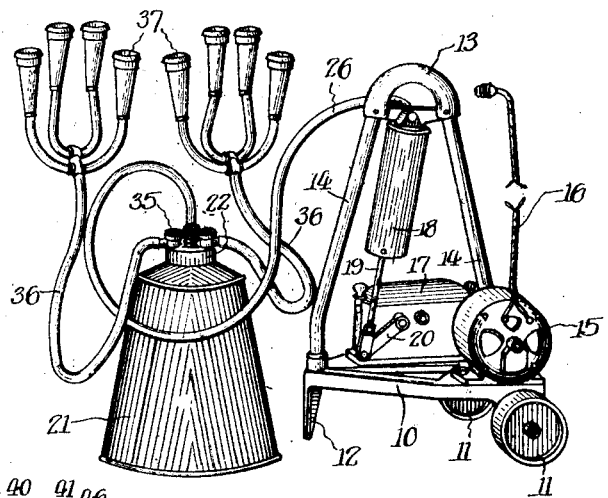
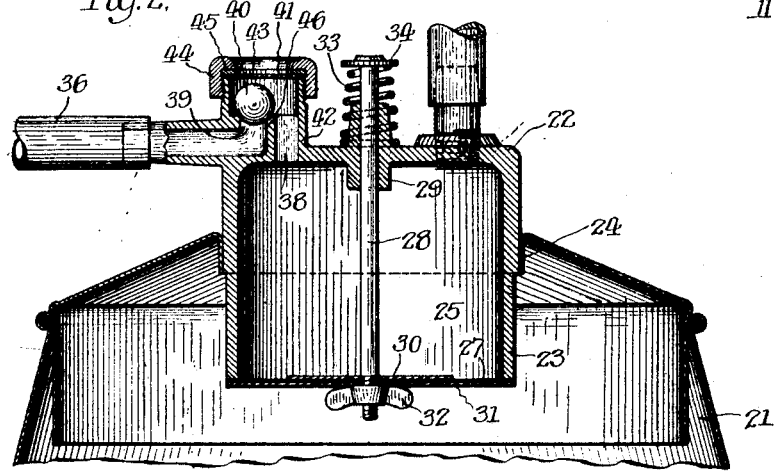
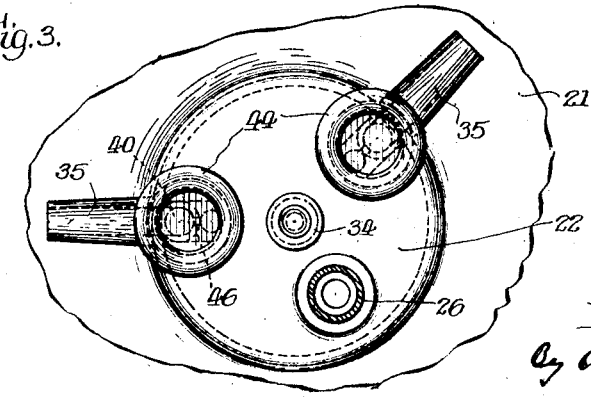

Patented Oct. 8, 1929

1,731,045

UNITED STATES PATENT OFFICE

FRANK S. FROST, OF OAK PARK, ILLINOIS

MILKING APPARATUS

Application filed September 18, 1924. Serial No. 738,334.

My invention relates to the art of milking mechanically, and more particularly to improvements in means for effecting pressure pulsations in the teat cups.

Heretofore complicated pulsators have commonly been employed to produce a varying suction in the teat cups. These pulsators operate in most instances to connect the teat cups alternately with two different and unequal sources of pressure.

The primary object of my invention is to provide simple and improved means for controlling the suction in the teat cups, said means permitting the use of an ordinary suction pump or its equivalent connected to directly exhaust said cups.

A more specific object resides in the provision of a novel valve in the suction line leading to the teat cups, said valve being constructed to permit a sudden exhaustion of air but to restrict the return flow, thereby preventing a drop in the suction sufficient to release the teat cups during the milking operation.

Further objects and advantages will become apparent as the description proceeds.

In the accompanying drawings, Figure 1 is a perspective view of a portable milking apparatus embodying the features of my invention.

Fig. 2 is a vertical section of the milk receptacle through one of the connections for the teat cup claws.

Fig. 3 is a fragmentary plan view of the milk receptacle.

In the exemplary embodiment of my invention, 10 represents a small truck frame which is provided at one end with a pair of wheels 11 and at the other end with a supporting peg 12, and which can be carried or moved from place to place by a handle 13 connecting the upper ends of two vertical standards 14. Supported on the frame 10 is an electric motor 15 having an extension cord 16, a reduction gearing 17 adapted to be driven by the motor, and a suitable suction pump 18 pivotally supported by the handle 13 and having its piston rod 19 connected to the end of a crank arm 20 on the reduction gearing.

The milking apparatus proper comprises a pail or receptacle 21 of suitable construction for receiving the milk, and a head or cover 22 closing said pail. In this instance, the head 22 is provided with a cylindrical flange 23 which extends downwardly through a flanged opening 24 in the top of the pail 21. The flange 23 defines a small chamber 25 which is connected with the suction pump 18 by a flexible tube 26. A rubber disk 27 removably mounted on the lower end of a vertical rod 28 extending slidably through a bearing 29 in the top of the head 22 is adapted to engage the lower edge of the flange 23 to close the chamber 25. The disk 27 is clamped between two plates 30 and 31 which are removably secured to the rod 28 by a wing nut 32. A coil spring 33 fitting over the upper ends of the rod 28 and the bearing 39 abuts at its opposite ends against the head 22 and a washer 34 on the upper end of the rod, and tends to hold the rubber disk 27 against the flange 23. It will be evident that on the suction stroke of the pump 18, the vacuum will be confined to the chamber 25, and that on the pressure stroke, the pressure will lower the disk 27 against the force of the spring 33 to open the chamber to the pail 21.

The top of the head 22 is formed integral with one or more nipples or fittings 35 to each of which a tube 36 leading to a cluster of teat cups 37 is attached. Each fitting 35 is formed with a tortuous passage 38 having a valve seat 39 adapted to be closed by a floating ball 40. The ball is located in a small chamber 41 defined by a vertical extension 42 of the fitting 35 and closed at the top by a transparent member 43 through which the flow of milk from the teat cups 37 can be observed. The member 43 is removably clamped against the upper edge of the extension 42 by a gland 44 suitably provided with packing 45. The seat 39 and the ball 40 constitute a one-way valve for preventing the flow of air from the head 22 to the teat cups 37.

Means is provided for preventing the ball 40 from closing the passage 38 completely on the pressure stroke of the pump 18. In the present instance, this means is in the form of a properly located vent, such as the notch 46 in the valve seat 39.

In use, the suction stroke of the pump 18 induces a relatively high vacuum in the chamber 25 and the teat cups 37, and thereby causes a flow of milk past the ball 40. This flow can be observed through the member 43. On the pressure stroke of the pump, the plate 27 is lowered to permit the milk to flow into the pail 21, and the ball 40 is seated to prevent the vacuum in the teat cups 37 from being completely destroyed. The vent or notch 46 permits the flow of a small stream of air past the ball valve to lower the vacuum in the teat cups 37 but not sufficient to release the teat cups. There is thus obtained a pulsating suction by the use of simple and inexpensive means.

While I have disclosed the preferred embodiment of my invention with considerable particularity for purposes of illustration, it is to be understood that I do not thereby intend to limit the same but aim to cover all modifications and alternative constructions falling within the spirit and scope of the appended claims.

I claim as my invention:

1. A milking apparatus having, in combination, a receptacle adapted to be subjected to varying pressure impulses, said receptacle having a passage adapted to be connected with a teat cup, and a check valve in said passage permitting a free flow into said receptacle, the seat of said valve being formed with a vent permitting a restricted flow past said valve out of said receptacle.

2. A milking apparatus having, in combination, a receptacle, a hollow head mounted on said receptacle and opening therein, a suction means including a suction pump connected with said head, means responsive to the pressure in said head for closing said head during the suction stroke of said pump and opening said head during the pressure stroke of said pump, a fitting on said head having a passage, a teat cup connected to said fitting and communicating through said passage with the interior of said head, a valve seat formed in said passage, a ball valve adapted to engage said seat on the pressure stroke of said pump to close said passage, and a notch in said seat for permitting the flow of a small stream of air past said ball when the latter is seated.

3. A milking apparatus having, in combination, a receptacle, means for creating alternating pressure and suction impulses in said receptacle, a fitting having a passage opening to said receptacle, a teat cup connected to said passage, and a valve in said passage, said valve comprising a seat formed in said passage, a valve member movable to engage said seat during the pressure impulse and to leave said seat during the suction impulse, and a vent in said valve permitting a restricted flow from said receptacle through said passage and between said seat and said valve member when said valve member is in engagement with said seat.

In testimony whereof, I have hereunto affixed my signature.

FRANK S. FROST.